(12) United States Patent
Hashimura et al.

(10) Patent No.: US 6,624,951 B2
(45) Date of Patent: Sep. 23, 2003

(54) OBJECTIVE LENS SYSTEM FOR OPTICAL PICKUPS

(75) Inventors: Junji Hashimura, Sakai (JP); Kyu Takada, Otsu (JP); Hideki Nagata, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/163,333

(22) Filed: Jun. 5, 2002

(65) Prior Publication Data

US 2003/0048544 A1 Mar. 13, 2003

(30) Foreign Application Priority Data

Jun. 21, 2001  (JP) ........................................ 2001-188739

(51) Int. Cl.[7] .............................. G02B 13/18; G02B 3/02
(52) U.S. Cl. ........................ 359/717; 359/661; 359/719
(58) Field of Search ........................ 359/15, 569, 629, 359/719, 721, 822, 656, 661, 708, 717, 793, 794; 369/53.26, 53.19, 44.14, 44.23, 112.23–112.26

(56) References Cited

U.S. PATENT DOCUMENTS 6,185,048 B1 * 2/2001 Ishii et al. .................. 359/687
6,353,588 B1    3/2002 Ori ........................ 369/112.24
6,388,822 B1 *  5/2002 Kitamura et al. ............ 359/793
2002/0005996 A1 * 1/2002 Kitamura et al. ............ 359/819
2002/0135891 A1 * 9/2002 Kimura et al. .............. 359/795

FOREIGN PATENT DOCUMENTS

JP   2000-075107 A   3/2000
JP   2000-180717 A   6/2000
JP   2000-206404 A   7/2000

* cited by examiner

*Primary Examiner*—Jordan M. Schwartz
*Assistant Examiner*—Jessica Stultz
(74) *Attorney, Agent, or Firm*—Sidley Austin Brown & Wood LLP

(57) ABSTRACT

An objective lens system for optical pickups performing at least one of reading and writing of information by condensing a luminous flux from a light source on an information recording medium, has the following two lens elements from a light source side: a first lens element having a first surface convex to the light source side and a second surface convex to the light source side; and a second lens element having a third surface convex to the light source side and a plane fourth surface, wherein the first surface is an aspherical surface.

8 Claims, 11 Drawing Sheets

OBJECTIVE LENS SYSTEM FOR OPTICAL PICKUPS

RELATED APPLICATION

This application is based on application No. 2001-188739 filed in Japan, the content of which is hereby incorporated by reference.

FIELD OF THE INVENTION

The present invention relates to an objective lens system for optical pickups, for example, to an objective lens system for optical pickups having a large numerical aperture (NA) and used as the objective lens system in optical pickups mounted in optical information recording apparatuses, magneto-optic recording apparatuses and the like.

DESCRIPTION OF THE PRIOR ART

Conventionally known optical information recording apparatuses use, as the objective lens systems for optical pickups, objective lens systems performing at least one of reading and writing of information from and onto information recording media (optical discs, etc.). Objective lens systems for optical pickups have various types. For example, as objective lens systems for optical pickups for blue lasers, two-element objective lens systems having positive refractive power are proposed in Japanese Laid-Open Patent Applications Nos. 2000-75107, 2000-206404 and 2000-180717.

The objective lens systems for optical pickups proposed in Japanese Laid-Open Patent Applications Nos. 2000-75107 and 2000-206404, the NA is increased by using a substantially hemisphere plano-convex second lens element (information recording medium side lens element). However, since the first lens element (light source side lens element) is bi-convex, it is difficult to secure a back focal length of the objective lens system for optical pickups, so that the thickness of the disc substrate cannot be increased. In the objective lens system for optical pickups proposed in Japanese Laid-Open Patent Application No. 2000-180717, the second lens element is a meniscus lens convex to the light source side. For this reason, it is difficult to secure an interval between the lens periphery and the disc substrate even if the back focal length is increased. Thus, this objective lens system is undesirable with respect to the working distance.

SUMMARY OF THE INVENTION

An object of the present invention is to provide an improved objective lens system for optical pickups.

Another object of the present invention is to provide an objective lens system for optical pickups being high is performance and small in size while having a large NA and securing a working distance.

The above-mentioned objects are achieved by an objective lens system for optical pickups performing at least one of reading and writing of information by condensing a luminous flux from a light source on an information recording medium, said objective lens system comprising the following two lens elements from a light source side: a first lens element having a first surface convex to the light source side and a second surface convex to the light source side; and a second lens element having a third surface convex to the light source side and a plane fourth surface, wherein the first surface is an aspherical surface.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Figure 1:
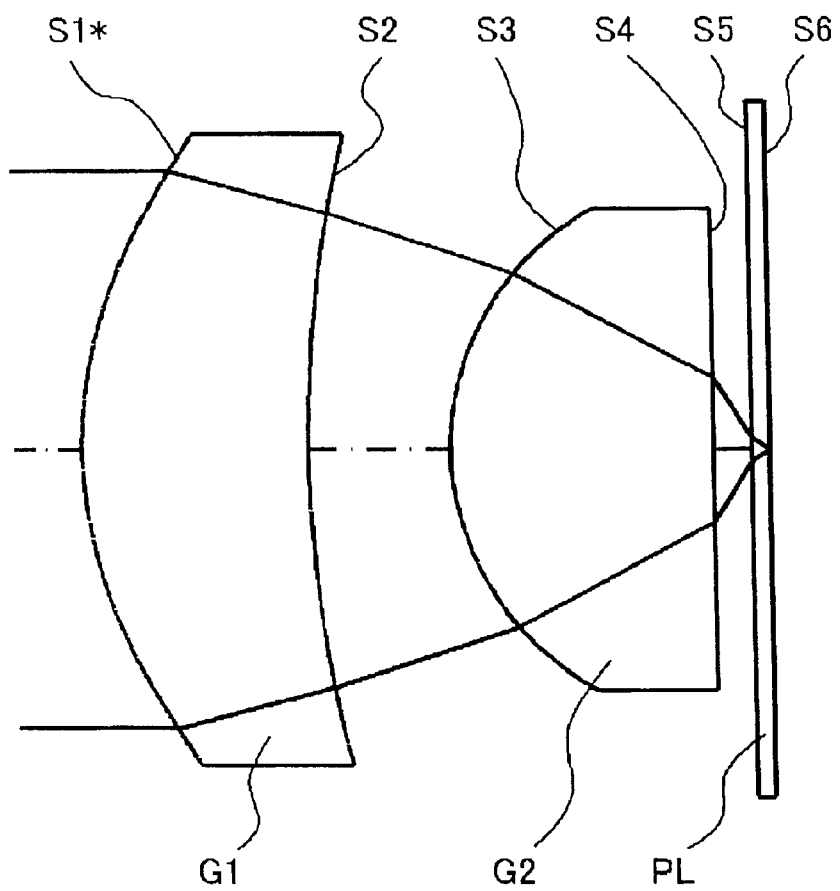
FIG. 1 shows the structure of a lens system of a first embodiment.
Figure 2:
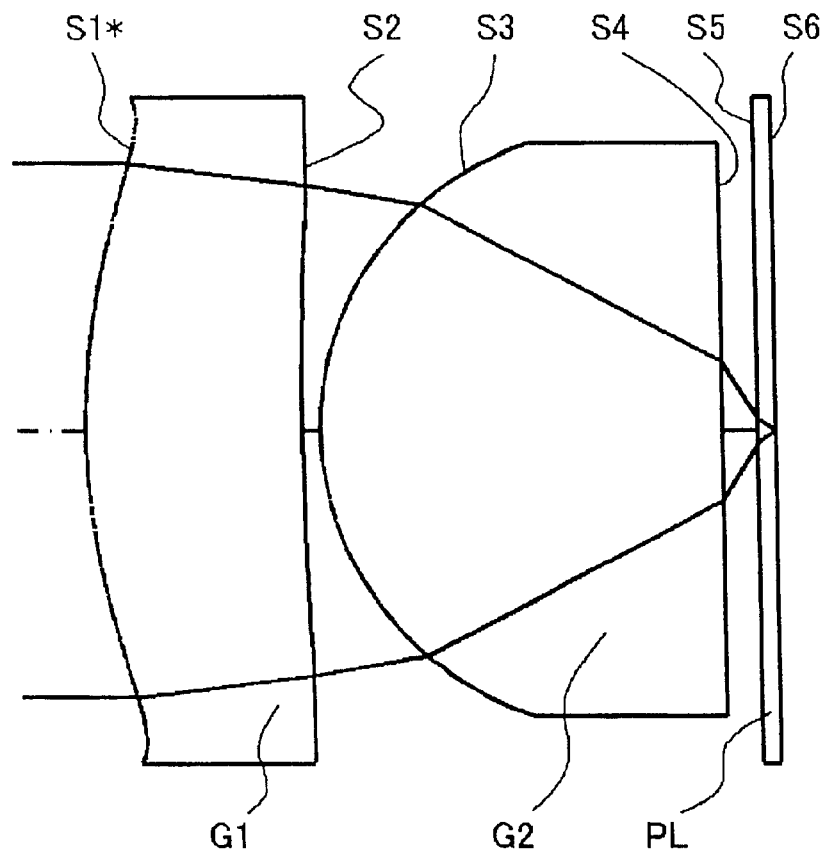
FIG. 2 shows the structure of a lens system of a second embodiment.
Figure 3:
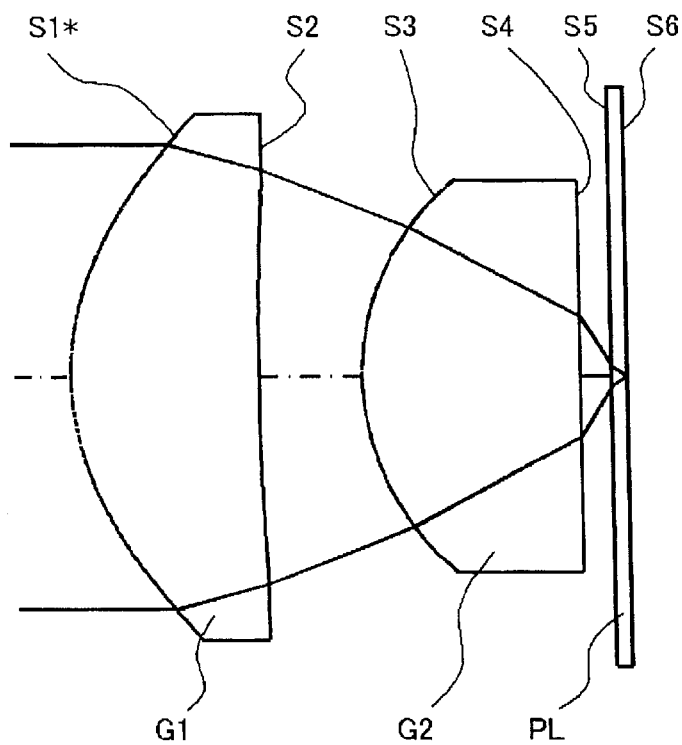
FIG. 3 shows the structure of a lens system of a third embodiment.
Figure 4:
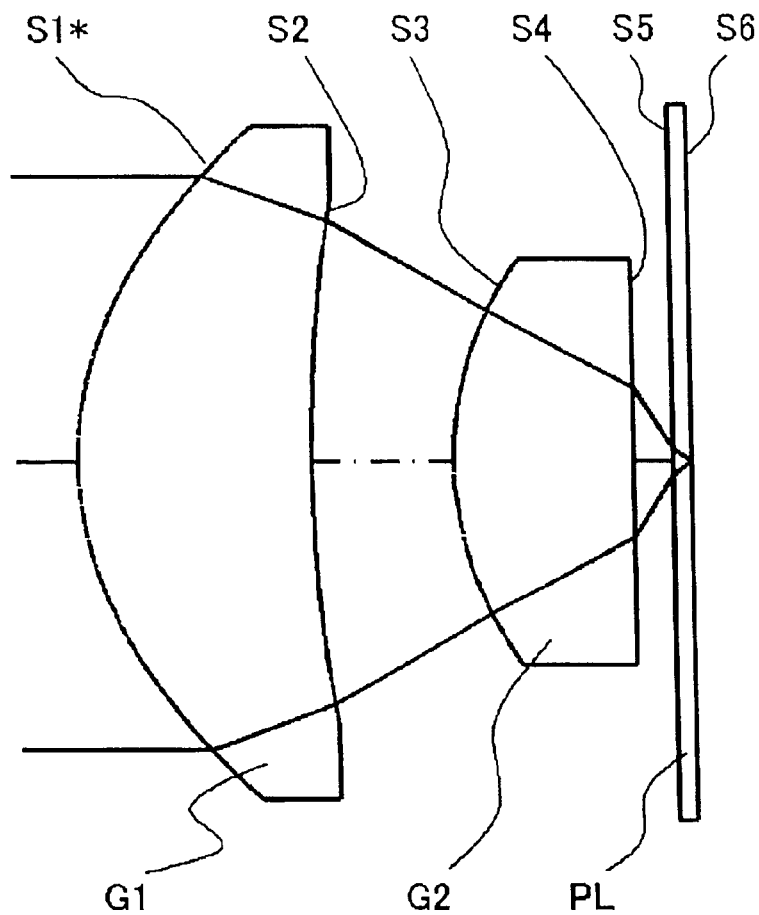
FIG. 4 shows the structure of a lens system of a fourth embodiment.
Figure 5:
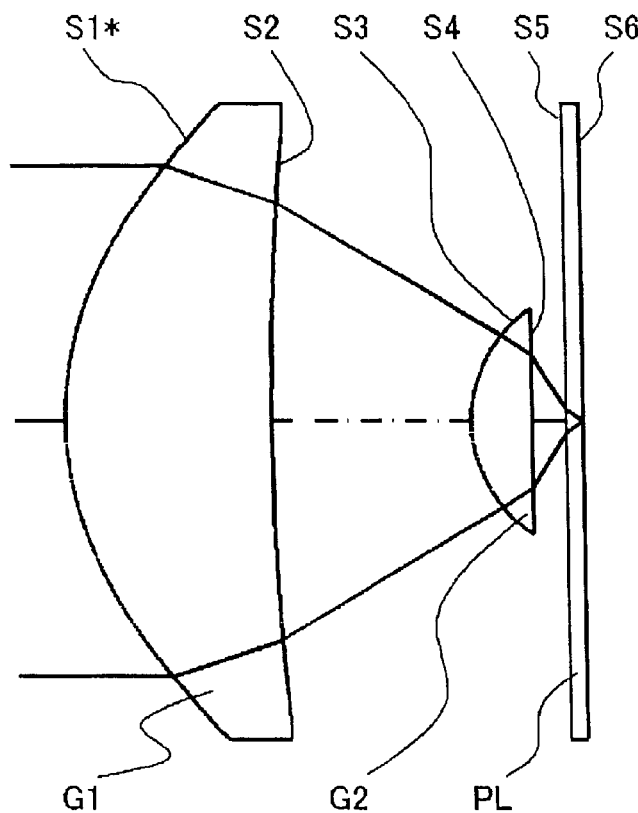
FIG. 5 shows the structure of a lens system of a fifth embodiment.
Figure 6:
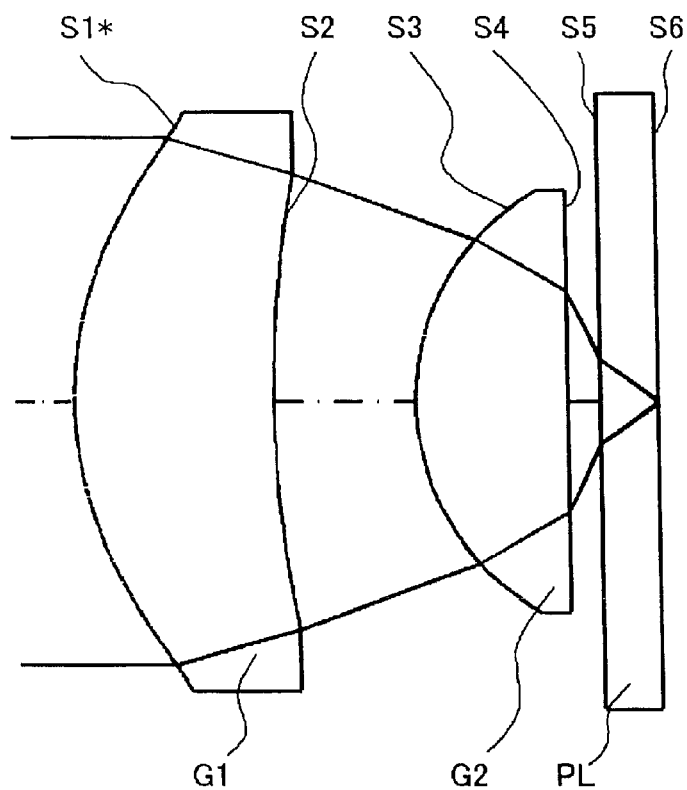
FIG. 6 shows the structure of a lens system of a sixth embodiment.
Figure 7:
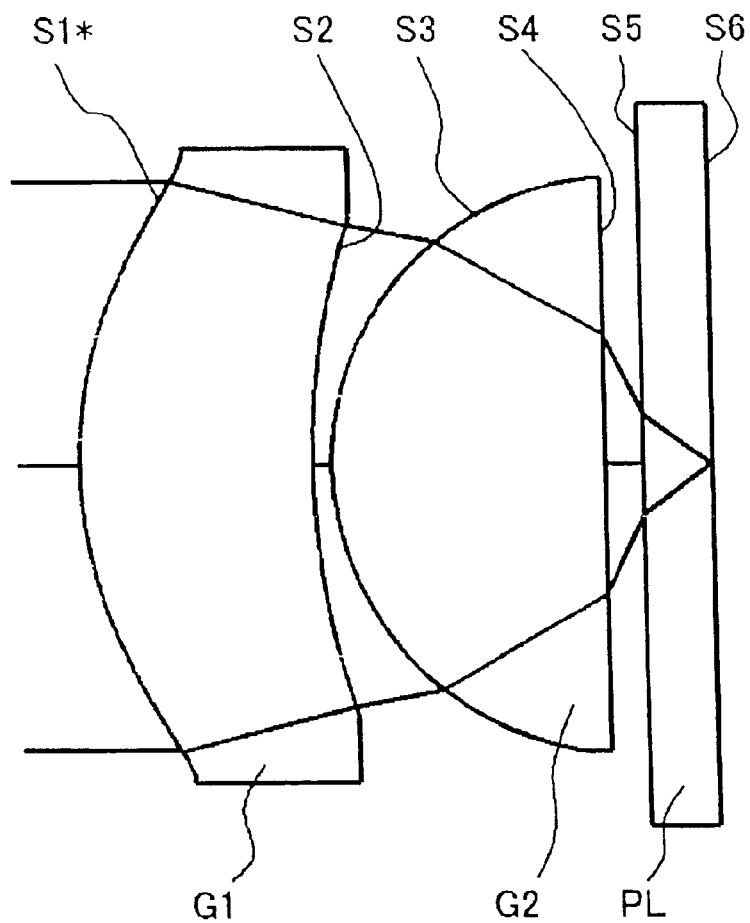
FIG. 7 shows the structure of a lens system of a seventh embodiment.

Objective lens systems for optical pickups embodying the present invention will be described with reference to the drawings. FIGS. 1 to 7 show the structures of lens systems corresponding to objective lens systems for optical pickups of first to seventh embodiments. In these figures, surfaces designated Si (i=1,2, ... ) are the i-th surfaces counted from the light source side, and surfaces designated Si marked with an asterisk are aspherical surfaces. These objective lens systems for optical pickups perform at least one of reading and writing of information by condensing a luminous flux from the light source on the information recording medium, and comprises the following two positive lens elements from the light source side: a first lens element (G1) having, from the light source side on the light source side, a first surface convex to the light source side and a second surface convex to the light source side; and a second lens element (G2) having a third surface convex to the light source side and a plane fourth surface. The planeparallel plate (PL) situated on the image side of each objective lens system for optical pickups corresponds to the disc substrate. While FIGS. 1 to 7 show the optical path of parallel incident light, the objective lens systems for optical pickups are usable as finite systems as well as infinite systems.

To increase the densities of optical discs and the like, it is effective to increase the NA of the objective lens system for optical pickups and shift the design wavelength to the blue side (that is, the shorter wavelength side). In increasing the NA of the objective lens system for optical pickups, if the focal length range is the same as that of conventional objective lens systems for optical pickups for compact discs (CDs), it is difficult to make the lens system compact because the lens diameter increases, and it is difficult to make the optical head lightweight because the lens weight increases. If the lens diameter is decreased with the focal length range being shorter than that of the conventional lens systems, a working distance substantially the same as that of the conventional lens systems is required. A margin for the optical disc tilt can be earned by thinning the disc substrate being used. However, if the disc substrate is too thin, problems arise with the substrate strength and productivity. Therefore, it is desirable for the optical disc to have a certain degree of thickness. Moreover, if the laser wavelength is shifted to the blue side, the wavefront error must be considered in short wavelengths, so that a higher optical performance than that of the conventional lens systems is required of the objective lens system for optical pickups.

In the embodiments, a large NA is secured by the first surface being an aspherical surface. Therefore, the use of the two lens elements (G1, G2) having such a characteristic configuration enables realization of a small-size objective lens system for optical pickups being small in diameter and having a high performance and a large NA while securing a back focal length and a working distance with the focal length range being smaller than that of conventional objective lens systems for optical pickups for CDs and digital video discs (DVDs).

In increasing the performance, it is further desirable for the above-mentioned aspherical surface to satisfy the condition (1) shown below like in the embodiments. The condition (1) defines a condition for achieving a high performance in an objective lens system for optical pickups being small in size and having a large NA. When the limits of the condition (1) are exceeded, aberration correction is difficult because higher-order aberrations are caused due to the aspherical surface, which is undesirable in increasing the performance. When the lower limit is exceeded, the aberration correction effect by the aspherical surface decreases, which is undesirable because it is difficult to correct, particularly, spherical aberration and it is therefore difficult to increase the performance.

The first surface:

$$0.05 \leq a1max - a1min \leq 1.0 \quad (1)$$

Here, when 0 to hmax of the x-th surface having an aspherical surface is graduated with a pitch of 0.1 such as 0.1 hmax, 0.2 hmax, ..., the maximum value of a is axmax and the minimum value of a is axmini, where:

$$a(h) = \frac{dz(h)}{dz} - \frac{h}{r - \sqrt{1 - \left(\frac{h}{r}\right)^2}}$$

h is the height, from the optical axis, of incidence of the axial ray incident on the aspherical surface;

hmax is the height, from the optical axis, of incidence of the axial marginal ray incident on the aspherical surface;

z(h) is the aspherical surface configuration (the distance, in the direction of the optical axis, from the vertex of the aspherical surface at each height;

$$z(h) = r - \sqrt{r^2 - \epsilon h^2} + (A4 \cdot H^4 + A6 \cdot H^6 + A8 \cdot H^8 \ldots)$$

r is the paraxial radius of curvature of the aspherical surface;

ε is the elliptic coefficient;

Ai is the ith-order aspherical coefficient of the aspherical surface; and dz(h)/dh is the differential value of the aspherical configuration with respect to the height of incidence.

It is desirable for the first lens element (G1) to satisfy the condition (2) shown below. The condition (2) defines a condition desirable for securing a back focal length and keeping the lens system compact while achieving a large NA. When the lower limit of the condition (2) is exceeded, it is difficult to secure a back focal length. When the upper limit of the condition (2) is exceeded, since the overall length of the lens system increases, the diameter of the lens system also increases when the NA is increased, so that it is difficult to make the lens system compact.

$$0.5 \leq R1/f \leq 4.0 \quad (2)$$

where:

R1 is the radius of curvature of the light source side surface of the first lens element; and f is the focal length of the objective lens system.

It is desirable for the second lens element (G2) to satisfy the condition (3) shown below. The condition (3) defines a condition desirable as the configuration of the second lens element (G2). When the lower limit of the condition (3) is exceeded, the radius of curvature of the lens system is too small, so that it is difficult to secure a part of the lens held by the lens barrel, which is undesirable in manufacturing and makes it difficult to hold the lens system. When the upper limit of the condition (3) is exceeded, since the radius of curvature of the lens system increases, the aberration caused on this surface increases, which is undesirable in increasing the NA.

$$0.3 \leq R3/f \leq 1.5 \quad (3)$$

where:

R3 is the radius of curvature of the light source side surface of the second lens element; and f is the focal length of the objective lens system.

It is desirable for the second surface not to be an aspherical surface. If the second surface is an aspherical surface, since this means that one lens element has a plurality of aspherical surfaces, decentering between the aspherical surfaces is severe.

It is desirable for the third surface not to be an aspherical surface. If the third surface is an aspherical surface, since this means that a plurality of lens elements in an optical system has an aspherical surface, decentering accuracy between the lens elements is severe.

In the construction data of the embodiments, si (i=1,2, ...) represents the i-th surface counted from the light source side, ri (i=1,2, ...) represents the radius of curvature (mm) of the surface si, di (i=1,2, ...) represents the i-th axial distance (axial thickness, mm) counted from the light source side, and Ni (i=1,2,3, ...) and vi (i=1,2,3, ...) represent the refractive index (Nd) and the Abbe number (vd), to the light of a wavelength of 405 nm and the light of the d-line, of the i-th optical element counted from the light source side, respectively. The surfaces si marked with an asterisk are aspherical surfaces, and defined by the above expression (Z(H)= ... ) representing the aspherical surface configuration. The wavelengths (λ) and the NAs of the light rays being used and the aspherical data of the aspherical surfaces are shown together with the other data. TABLEs 15 to 21 show corresponding values of the conditions of the embodiments.

TABLE 1

Ex. 1 Wavelnegth = 405 nm
NA = 0.85

| Surface | Radius of Curvaure | Axial Distance | Refracticve Index (405 nm) | Refracticve Index (d-line) | Abbe Number $\nu_d$ |
|---|---|---|---|---|---|
| 1* | 2.379 | 0.420 | 1.200 | 1.79928 | 1.77250 |
| 2 | 7.032 | 0.142 | 0.750 | | |
| 3 | 1.482 | 0.675 | 1.400 | 1.79928 | 1.77250 |
| 4 | INFINITY | 0.000 | 0.200 | | |
| 5 | INFINITY | 0.000 | 0.100 | 1.53022 | 1.51680 |
| 6 | INFINITY | 0.000 | | | |

TABLE 2

Ex. 1
Aspherical Coefficient

| 非球面係数 | S1 |
|---|---|
| $\epsilon$ | 1 |
| A4 | $-6.27658E - 03$ |
| A6 | $7.62760E - 04$ |
| A8 | $-2.00616E - 03$ |
| A10 | $8.15452E - 04$ |
| A12 | $-1.71331E - 04$ |
| A14 | $0.00000E + 00$ |
| A16 | $0.00000E + 00$ |

TABLE 3

Ex. 2 Wavelnegth = 405 nm
NA = 0.85

| Surface | Radius of Curvaure | Axial Distance | Refracticve Index (405 nm) | Refracticve Index (d-line) | Abbe Number $\nu_d$ |
|---|---|---|---|---|---|
| 1* | 4.000 | 0.250 | 1.200 | 1.79928 | 1.77250 |
| 2 | 22.516 | 0.044 | 0.100 | | |
| 3 | 1.695 | 0.590 | 2.209 | 1.79928 | 1.77250 |
| 4 | INFINITY | 0.000 | 0.200 | | |
| 5 | INFINITY | 0.000 | 0.100 | 1.53022 | 1.51680 |
| 6 | INFINITY | 0.000 | | | |

TABLE 4

Ex. 2
Aspherical Coefficient

| | S1 |
|---|---|
| $\epsilon$ | 1 |
| A4 | $-5.08768E - 03$ |
| A6 | $3.00444E - 03$ |
| A8 | $-3.57950E - 03$ |
| A10 | $1.57336E - 03$ |
| A12 | $-2.94174E - 04$ |
| A14 | $0.00000E + 00$ |
| A16 | $0.00000E + 00$ |

TABLE 5

Ex. 3 Wavelnegth = 405 nm
NA = 0.85

| Surface | Radius of Curvaure | Axial Distance | Refracticve Index (405 nm) | Refracticve Index (d-line) | Abbe Number $\nu_d$ |
|---|---|---|---|---|---|
| 1* | 1.800 | 0.556 | 1.200 | 1.53022 | 1.51680 |
| 2 | 21.204 | 0.047 | 0.665 | | |
| 3 | 1.629 | 0.614 | 1.400 | 1.79928 | 1.77250 |
| 4 | INFINITY | 0.000 | 0.200 | | |
| 5 | INFINITY | 0.000 | 0.100 | 1.53022 | 1.51680 |
| 6 | INFINITY | 0.000 | | | |

TABLE 6

Ex. 3
Aspherical Coefficient

| | S1 |
|---|---|
| $\epsilon$ | 1 |
| A4 | $-1.76934E - 02$ |
| A6 | $3.87603E - 03$ |
| A8 | $-8.30720E - 03$ |
| A10 | $3.42703E - 03$ |
| A12 | $-7.59128E - 04$ |
| A14 | $0.00000E + 00$ |
| A16 | $0.00000E + 00$ |

TABLE 7

Ex. 4 Wavelnegth = 405 nm
NA = 0.85

| Surface | Radius of Curvaure | Axial Distance | Refracticve Index (405 nm) | Refracticve Index (d-line) | Abbe Number $\nu_d$ |
|---|---|---|---|---|---|
| 1* | 1.838 | 0.544 | 1.200 | 1.79928 | 1.77250 |
| 2 | 8.397 | 0.119 | 0.735 | | |
| 3 | 1.800 | 0.556 | 0.932 | 1.79928 | 1.77250 |
| 4 | INFINITY | 0.000 | 0.200 | | |
| 5 | INFINITY | 0.000 | 0.100 | 1.53022 | 1.51680 |
| 6 | INFINITY | 0.000 | | | |

TABLE 8

Ex. 4
Aspherical Coefficient

| | S1 |
|---|---|
| $\epsilon$ | 1 |
| A4 | $-1.23523E - 02$ |
| A6 | $1.40465E - 03$ |
| A8 | $-4.93438E - 03$ |
| A10 | $1.98175E - 03$ |
| A12 | $-4.72994E - 04$ |
| A14 | $0.00000E + 00$ |
| A16 | $0.00000E + 00$ |

TABLE 9

Ex. 5 Wavelnegth = 405 nm
NA = 0.85

| Surface | Radius of Curvature | Axial Distance | Refracticve Index (405 nm) | Refracticve Index (d-line) | Abbe Number ν d |
|---------|---------------------|----------------|---------------------------|---------------------------|------------------|
| 1*      | 1.941               | 0.515          | 1.200                     | 1.79928                   | 1.77250          |
| 2       | 18.027              | 0.055          | 1.171                     |                           |                  |
| 3       | 0.800               | 1.250          | 0.356                     | 1.53022                   | 1.51680          |
| 4       | INFINITY            | 0.000          | 0.200                     |                           |                  |
| 5       | INFINITY            | 0.000          | 0.100                     | 1.53022                   | 1.51680          |
| 6       | INFINITY            | 0.000          |                           |                           |                  |

TABLE 10

Ex. 5
Aspherical Coefficient

| | S1 |
|---|---|
| ε   | 1              |
| A4  | −1.16932E − 02 |
| A6  | 2.98936E − 04  |
| A8  | −3.24793E − 03 |
| A10 | 1.25982E − 03  |
| A12 | −2.90641E − 04 |
| A14 | 0.00000E + 00  |
| A16 | 0.00000E + 00  |

TABLE 11

Ex. 6 Wavelnegth = 405 nm
NA = 0.85

| Surface | Radius of Curvature | Axial Distance | Refracticve Index (405 nm) | Refracticve Index (d-line) | Abbe Number ν d |
|---------|---------------------|----------------|---------------------------|---------------------------|------------------|
| 1*      | 2.239               | 0.447          | 1.200                     | 1.79928                   | 1.77250          |
| 2       | 7.407               | 0.135          | 0.856                     |                           |                  |
| 3       | 1.471               | 0.680          | 0.921                     | 1.79928                   | 1.77250          |
| 4       | INFINITY            | 0.000          | 0.200                     |                           |                  |
| 5       | INFINITY            | 0.000          | 0.350                     | 1.53022                   | 1.51680          |
| 6       | INFINITY            | 0.000          |                           |                           |                  |

TABLE 12

Ex. 6
Aspherical Coefficient

| | S1 |
|---|---|
| ε   | 1              |
| A4  | −8.44071E − 03 |
| A6  | 4.25673E − 03  |
| A8  | −8.83951E − 03 |
| A10 | 7.40306E − 03  |
| A12 | −3.67869E − 03 |
| A14 | 9.58843E − 04  |
| A16 | −1.05207E − 04 |

TABLE 13

Ex. 7 Wavelnegth = 405 nm
NA = 0.85

| Surface | Radius of Curvaure | Axial Distance | Refracticve Index (405 nm) | Refracticve Index (d-line) | Abbe Number ν d |
|---------|--------------------|----------------|---------------------------|---------------------------|------------------|
| 1*      | 2.202              | 0.454          | 1.200                     | 1.79928                   | 1.77250          |
| 2       | 4.104              | 0.244          | 0.100                     |                           |                  |
| 3       | 1.491              | 0.671          | 1.400                     | 1.79928                   | 1.77250          |
| 4       | INFINITY           | 0.000          | 0.200                     |                           |                  |
| 5       | INFINITY           | 0.000          | 0.350                     | 1.53022                   | 1.51680          |
| 6       | INFINITY           | 0.000          |                           |                           |                  |

TABLE 14

Aspherical Coefficient

| | S1 |
|---|---|
| ε   | 1              |
| A4  | −6.94182E − 03 |
| A6  | 2.35854E − 04  |
| A8  | −7.51803E − 03 |
| A10 | 1.04911E − 02  |
| A12 | −7.90352E − 03 |
| A14 | 2.90103E − 03  |
| A16 | −4.28173E − 04 |

Figure 8:
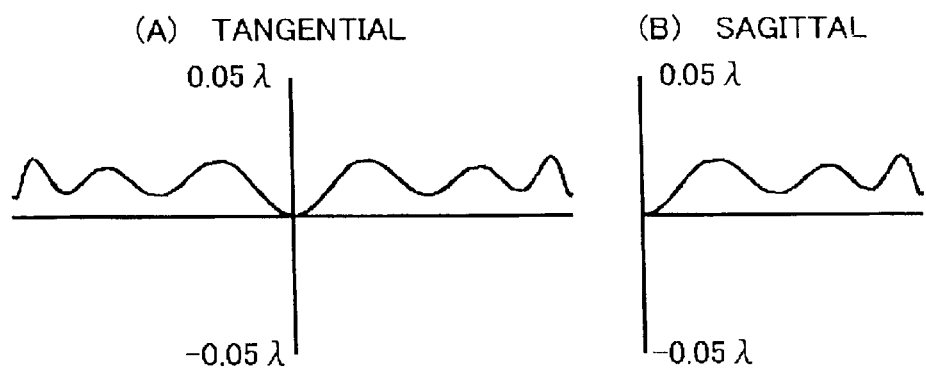
FIGS. 8(A) and 8(B) show aberrations of the first embodiment.
Figure 9:
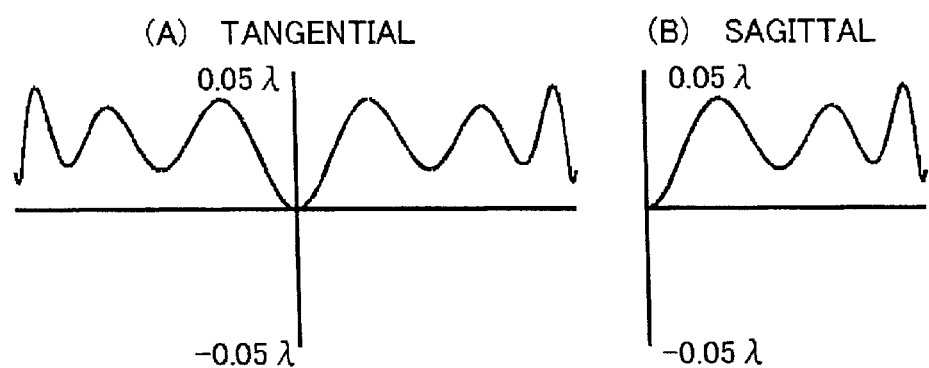
FIGS. 9(A) and 9(B) show aberrations of the second embodiment.
Figure 10:
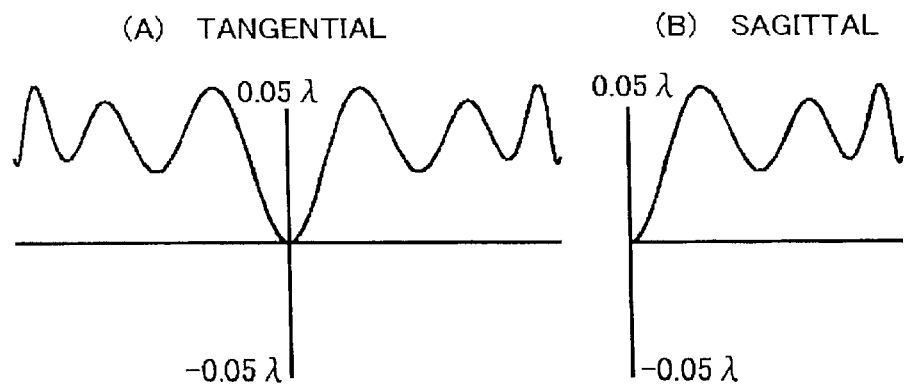
FIGS. 10(A) and 10(B) show aberrations of the third embodiment.
Figure 11:
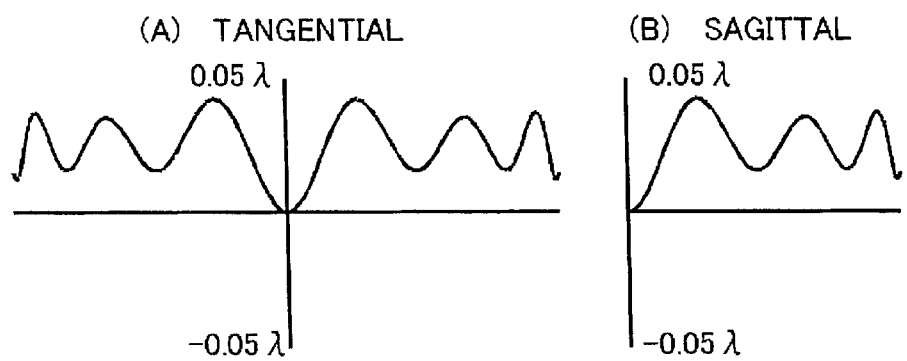
FIGS. 11(A) and 11(B) show aberrations of the fourth embodiment.
Figure 12:
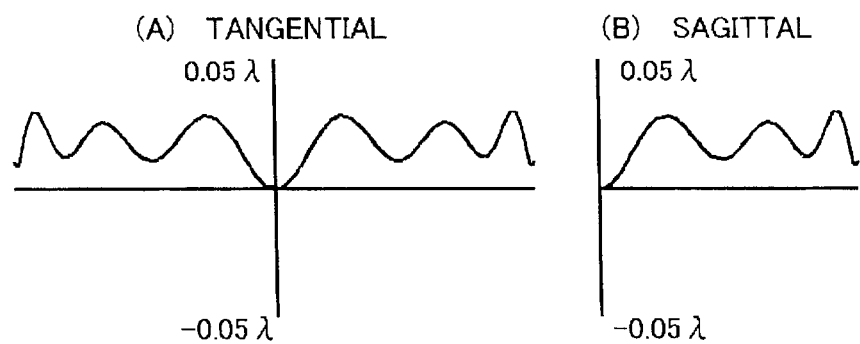
FIGS. 12(A) and 12(B) show aberrations of the fifth embodiment.
Figure 13:
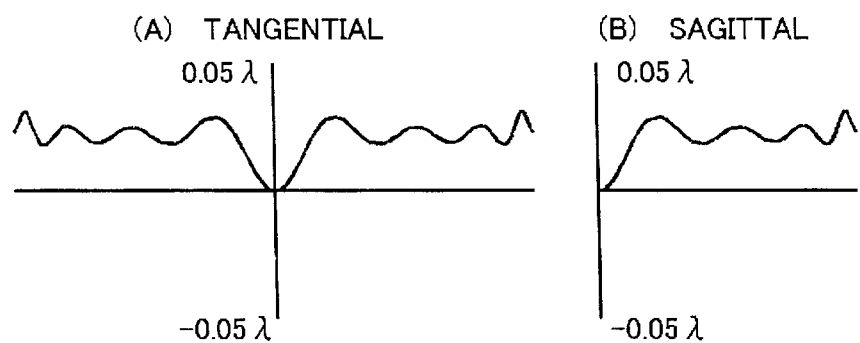
FIGS. 13(A) and 13(B) show aberrations of the sixth embodiment.
Figure 14:
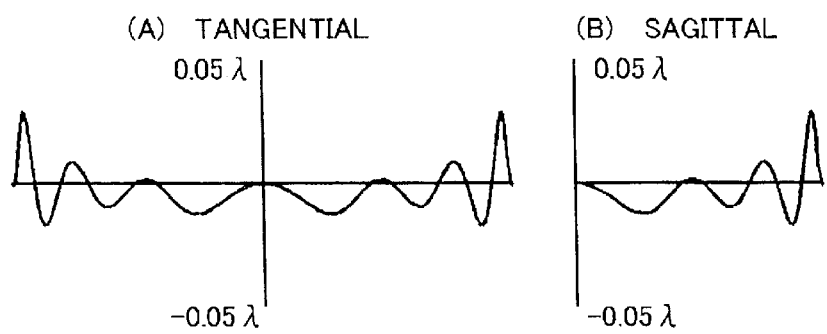
FIGS. 14(A) and 14(B) show aberrations of the seventh embodiment.

FIGS. 8(A) and 8(B) through 14(A) to 14(B) show aberrations of the first to the seventh embodiments. FIGS. 8(A) to 14(A) show wavefront aberrations (TANGENTIAL) in a tangential luminous flux. FIGS. 8(B) to 14(B) show wavefront aberrations (SAGITTAL) in a sagittal luminous flux ($\lambda$=405.0 nm). Since wavefront aberrations are important in objective lens systems for optical pickups, wavefront aberrations at an image height of 0 are shown in the figures.

TABLE 15

Ex. 1

| dz(h)/dh-h/(r*SQRT(1-(h/r)^2)) | S1 |
|---|---|
| Condition (1) | |
| 0.0 hmax | 0.0000 |
| 0.1 hmax | −0.0001 |
| 0.2 hmax | −0.0007 |
| 0.3 hmax | −0.0023 |
| 0.4 hmax | −0.0054 |
| 0.5 hmax | −0.0111 |
| 0.6 hmax | −0.0208 |
| 0.7 hmax | −0.0367 |
| 0.8 hmax | −0.0627 |
| 0.9 hmax | −0.1068 |
| 1.0 hmax | −0.1885 |
| αmax-αmin | 0.1885 |
| Condition (2) | |
| r1/f | 1.3465 |
| Condition (3) | |
| r3/f | 0.8390 |

TABLE 16

Ex. 2

| dz(h)/dh-h/(r*SQRT(1-(h/r)^2)) | S1 |
|---|---|
| Condition (1) | |
| 0.0 hmax | 0.0000 |
| 0.1 hmax | −0.0001 |
| 0.2 hmax | −0.0005 |
| 0.3 hmax | −0.0016 |
| 0.4 hmax | −0.0036 |
| 0.5 hmax | −0.0071 |
| 0.6 hmax | −0.0129 |
| 0.7 hmax | −0.0225 |
| 0.8 hmax | −0.0380 |
| 0.9 hmax | −0.0647 |
| 1.0 hmax | −0.1216 |
| αmax−αmin | 0.1216 |
| Condition (2) | |
| r1/f | 2.279 |
| Condition (3) | |
| r3/f | 0.966 |

TABLE 17

Ex. 3

| dz(h)/dh-h/(r*SQRT(1-(h/r)^2)) | S1 |
|---|---|
| Condition (1) | |
| 0.0 hmax | 0.0000 |
| 0.1 hmax | −0.0002 |
| 0.2 hmax | −0.0019 |
| 0.3 hmax | −0.0062 |
| 0.4 hmax | −0.0150 |
| 0.5 hmax | −0.0310 |
| 0.6 hmax | −0.0592 |
| 0.7 hmax | −0.1082 |
| 0.8 hmax | −0.1934 |
| 0.9 hmax | −0.3498 |
| 1.0 hmax | −0.6682 |
| αmax−αmin | 0.6682 |
| Condition (2) | |
| r1/f | 1.013 |
| Condition (3) | |
| r3/f | 0.917 |

TABLE 18

Ex. 4

| dz(h)/dh-h/(r*SQRT(1-(h/r)^2)) | S1 |
|---|---|
| Condition (1) | |
| 0.0 hmax | 0.0000 |
| 0.1 hmax | −0.0002 |
| 0.2 hmax | −0.0013 |
| 0.3 hmax | −0.0045 |
| 0.4 hmax | −0.0109 |
| 0.5 hmax | −0.0229 |
| 0.6 hmax | −0.0440 |
| 0.7 hmax | −0.0810 |
| 0.8 hmax | −0.1458 |
| 0.9 hmax | −0.2653 |

TABLE 18-continued

Ex. 4

| dz(h)/dh-h/(r*SQRT(1-(h/r)^2)) | S1 |
|---|---|
| 1.0 hmax | −0.5063 |
| αmax−αmin | 0.5063 |
| Condition (2) | |
| r1/f | 1.034 |
| Condition (3) | |
| r3/f | 1.013 |

TABLE 19

Ex. 5

| dz(h)/dh-h/(r*SQRT(1-(h/r)^2)) | S1 |
|---|---|
| Condition (1) | |
| 0.0 hmax | 0.0000 |
| 0.1 hmax | −0.0002 |
| 0.2 hmax | −0.0013 |
| 0.3 hmax | −0.0043 |
| 0.4 hmax | −0.0106 |
| 0.5 hmax | −0.0220 |
| 0.6 hmax | −0.0417 |
| 0.7 hmax | −0.0748 |
| 0.8 hmax | −0.1304 |
| 0.9 hmax | −0.2264 |
| 1.0 hmax | −0.4056 |
| Amax−αmin | 0.4056 |
| Condition (2) | |
| r1/f | 1.098 |
| Condition (3) | |
| r3/f | 0.453 |

TABLE 20

Ex. 6

| dz(h)/dh-h/(r*SQRT(1-(h/r)^2)) | S1 |
|---|---|
| Condition (1) | |
| 0.0 hmax | 0.0000 |
| 0.1 hmax | −0.0001 |
| 0.2 hmax | −0.0010 |
| 0.3 hmax | −0.0034 |
| 0.4 hmax | −0.0082 |
| 0.5 hmax | −0.0169 |
| 0.6 hmax | −0.0321 |
| 0.7 hmax | −0.0577 |
| 0.8 hmax | −0.1013 |
| 0.9 hmax | −0.1796 |
| 1.0 hmax | −0.3425 |
| Amax−αmin | 0.3425 |
| Condition (2) | |
| r1/f | 1.256 |
| Condition (3) | |
| r3/f | 0.825 |

TABLE 21

| Ex. 7 | |
|---|---|
| dz(h)/dh-h/(r*SQRT(1-(h/r)^2)) | S1 |
| Condition (1) | |
| 0.0 hmax | 0.0000 |
| 0.1 hmax | −0.0001 |
| 0.2 hmax | −0.0007 |
| 0.3 hmax | −0.0025 |
| 0.4 hmax | −0.0064 |
| 0.5 hmax | −0.0137 |
| 0.6 hmax | −0.0263 |
| 0.7 hmax | −0.0479 |
| 0.8 hmax | −0.0858 |
| 0.9 hmax | −0.1550 |
| 1.0 hmax | −0.3139 |
| αmax−αmin | 0.3139 |
| Condition (2) | |
| r1/f | 1.344 |
| Condition (3) | |
| r3/f | 0.910 |

As described above, according to the present invention, an objective lens system for optical pickups being high in performance and small in size while having a large NA and securing a working distance can be realized. The use of the objective lens system for optical pickups according to the present invention in optical pickup apparatuses (optical information recording apparatuses, magneto-optic recording apparatuses, etc.) contributes to higher densities of optical discs and the like.

Although the present invention has been fully described by way of examples with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An objective lens system for optical pickups performing at least one of reading and writing of information by condensing a luminous flux from a light source on an information recording medium, said objective lens system comprising the following two lens elements in order from a light source side:

a first lens element having a first surface convex to the light source side and a second surface convex to the light source side; and a second lens element having a third surface convex to the light source side and a planar fourth surface, wherein the first surface is an aspherical surface, and both the second and third surfaces are spherical surfaces.

2. An objective lens system as claimed in claim 1, wherein the system satisfies the following condition (1):

$$0.05 \leq a1max - a1min \leq 1.0 \tag{1}$$

where, when 0 to hmax of the x-th surface having an aspherical surface is graduated with a pitch of 0.1 such as 0.1 hmax, 0.2 hmax, . . . , the maximum value of a is axmax and the minimum value of a is axmini, and where:

$$a(h) = \frac{dz(h)}{dz} - \frac{h}{r - \sqrt{1-\left(\frac{h}{r}\right)^2}}$$

h is the height, from the optical axis, of incidence of the axial ray incident on the aspherical surface;

hmax is the height, from the optical axis, of incidence of the axial marginal ray incident on the aspherical surface;

z(h) is the aspherical surface configuration (the distance, in the direction of the optical axis, from the vertex of the aspherical surface at each height, satisfying the equation;

$$z(h) = r - \sqrt{r^2 - \epsilon h^2} + (A4 \cdot H^4 + A6 \cdot H^6 + A8 \cdot H^8 \ldots)$$

where, r is the paraxial radius of curvature of the aspherical surface;

ε is the elliptic coefficient;

Ai is the ith-order aspherical coefficient of the aspherical surface; and dz(h)/dh is the differential value of the aspherical configuration with respect to the height of incidence.

3. An objective lens system as claimed in claim 1, wherein the system satisfies the following condition (2):

$$0.5 \leq R1/f \leq 4.0 \tag{2}$$

where:

R1 is the radius of curvature of the light source side surface of the first lens element; and f is the focal length of the objective lens system.

4. An objective lens system as claimed in claim 1, wherein the system satisfies the following condition (3):

$$0.5 \leq R3/f \leq 1.5 \tag{3}$$

where:

R3 is the radius of curvature of the light source side surface of the second lens element; and f is the focal length of the objective lens system.

5. An objective lens system as claimed in claim 1, wherein the system satisfies the following conditions (2) and (3):

$$0.5 \leq R1/f \leq 4.0 \tag{2}$$
$$0.5 \leq R3/f \leq 1.5 \tag{3}$$

where:

R1 is the radius of curvature of the light source side surface of the first lens element;

R3 is the radius of curvature of the light source side surface of the second lens element; and f is the focal length of the objective lens system.

6. An objective lens system as claimed in claim 1, wherein the luminous flux is parallel incident light.

7. An objective lens system as claimed in claim 1, wherein the luminous flux has a finite objective point.

8. An objective lens system for optical pickups performing at least one of reading and writing of information by condensing a luminous flux from a light source on an information recording medium, said objective lens system comprising the following two lens elements in order from a light source side:

a first lens element having a first surface convex to the light source side and a second surface convex to the light source side; and a second lens element having a third surface convex to the light source side and a planar fourth surface, wherein the first surface is an aspherical surface, and both the second and third surfaces are spherical surfaces, and wherein the objective lens systems is usable for an incident light having 405 nm wavelength.

* * * * *

UNITED STATES PATENT AND TRADEMARK OFFICE
CERTIFICATE OF CORRECTION

PATENT NO. : 6,624,951 B2
DATED : September 23, 2003
INVENTOR(S) : Junji Hashimura et al.

It is certified that error appears in the above-identified patent and that said Letters Patent is hereby corrected as shown below:

Column 1,
Line 54, delete "is", and insert -- in --.

Column 5,
Line 7, delete "Wavelnegth", and insert -- Wavelength --.
Line 9, delete both instances of "Refracticve", and insert for both instances -- Refractive --.
Lines 27 and 28, delete the Japanese language characters.
Line 41, delete "Wavelnegth", and insert -- Wavelength --.

Column 6,
Line 5, delete "Wavelnegth", and insert -- Wavelength --.
Line 8, delete both instances of "Refracticve", and insert for both instances -- Refractive --.
Line 41, delete "Wavelnegth", and insert -- Wavelength --.
Line 43, delete both instances of "Refractive", and insert for both instances -- Refractive --.

Column 7,
Line 5, delete "Wavelnegth", and insert -- Wavelength --.
Line 8, delete both instances of "Refracticve", and insert for both instances -- Refractive --.
Line 41, delete "Wavelnegth", and insert -- Wavelength --.
Line 43, delete both instances of "Refracticve", and insert for both instances -- Refractive --.

Column 8,
Line 5, delete "Wavelnegth", and insert -- Wavelength --.
Line 8, delete both instances of "Refracticve", and insert for both instances -- Refractive --.

Column 10,
Line 37, delete "Amax-$\alpha$min", and insert -- $\alpha$max-$\alpha$min --.
Line 61, delete "Amax-$\alpha$min", and insert -- $\alpha$max-$\alpha$min --.

UNITED STATES PATENT AND TRADEMARK OFFICE
CERTIFICATE OF CORRECTION

PATENT NO. : 6,624,951 B2
DATED : September 23, 2003
INVENTOR(S) : Junji Hashimura et al.

It is certified that error appears in the above-identified patent and that said Letters Patent is hereby corrected as shown below:

Column 14,
Line 1, delete "systems", and insert -- system --.

Signed and Sealed this

Seventeenth Day of August, 2004

JON W. DUDAS
*Acting Director of the United States Patent and Trademark Office*